March 10, 1953 — A. P. KLOTH — 2,630,973
STEAM RADIATOR ATTACHMENT
Filed April 16, 1949
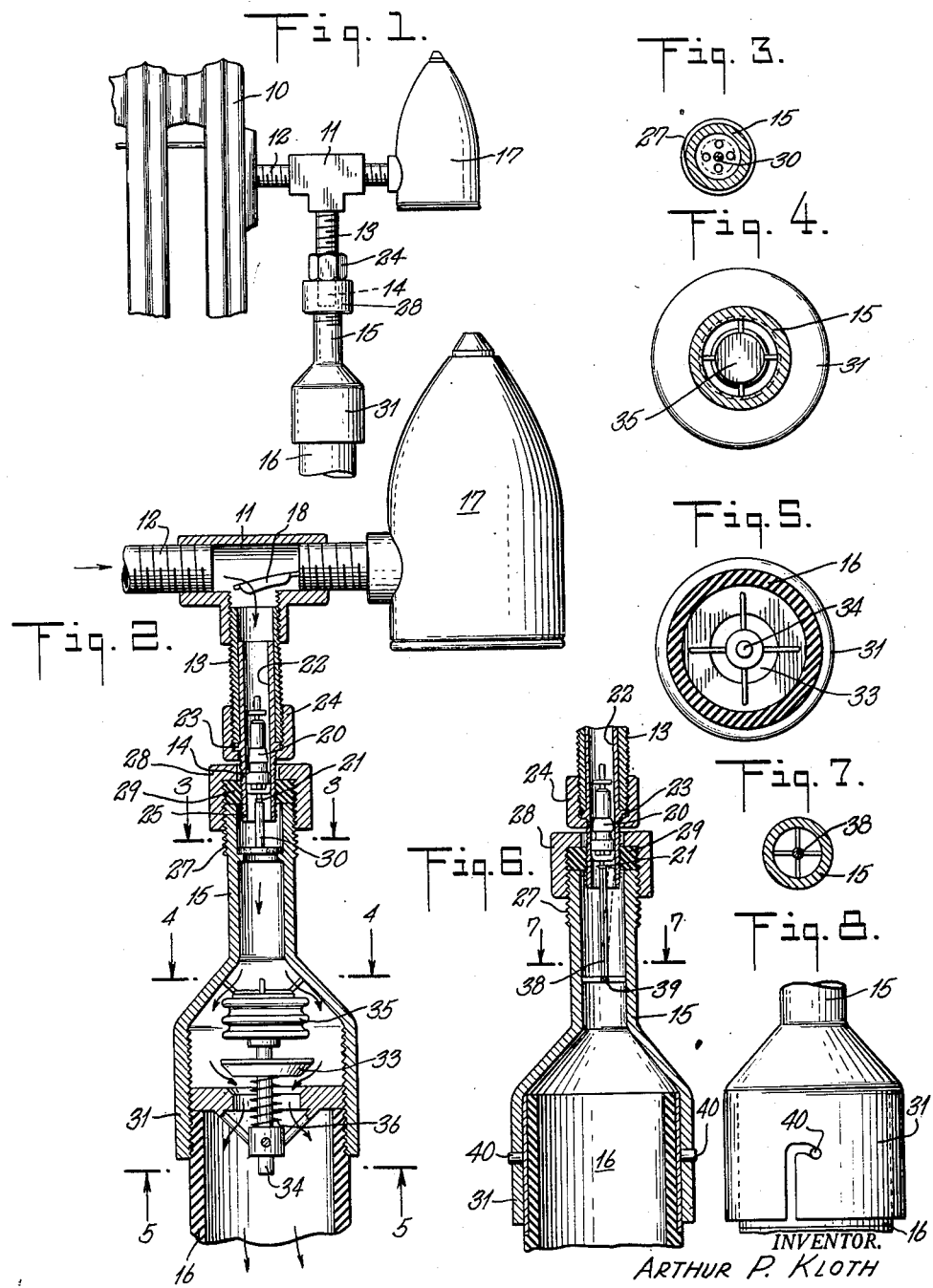
INVENTOR.
ARTHUR P. KLOTH
BY
ATTORNEY Patented Mar. 10, 1953

2,630,973

UNITED STATES PATENT OFFICE 2,630,973

STEAM RADIATOR ATTACHMENT

Arthur Paul Kloth, Brooklyn, N. Y.

Application April 16, 1949, Serial No. 87,965

4 Claims. (Cl. 237—68)

Steam heating systems when allowed to cool accumulate cold air in the radiators and leaders as a result of which it takes some time to get the system warm and frequently in attempting to force the warm up the fire is unsuccessfully driven.

It is my object to hasten the warm up in the most inexpensive and expeditious manner.

I have accordingly provided a simple attachment by means of which the cold air can be exhausted quickly from the radiator so that steam can immediately follow.

In its simplest form the invention contemplates the use of a check valve attached to each radiator or to the last radiator in the system. This check valve is spring-pressed and normally closed. To this check valve is applied a suction device such as a vacuum cleaner pipe or hose. The suction device is provided with means for automatically opening the check valve as the suction device is applied.

When the suction motor is started, the cold air is very quickly withdrawn and the steam flows to heat the radiator at once. The suction device is then detached. A thermostatic device may be provided to automatically close the outlet when the steam or hot air reaches the valve in case the suction device is not promptly detached.

Fig. 1 is a view of a fragment of a radiator with my invention applied.

Fig. 2 is a side and partial sectional view of the attachment on a larger scale.

Fig. 3 is a cross-sectional view taken on the plane of the line 3—3 of Fig. 2.

Fig. 4 is a cross-sectional view taken on the plane of the line 4—4 of Fig. 2.

Fig. 5 is a cross-sectional view taken on the plane of the line 5—5 of Fig. 2.

Fig. 6 is a longitudinal sectional view showing a modification of the automatic closing valve.

Fig. 7 is a cross-sectional view taken on the plane of the line 7—7 of Fig. 6.

Fig. 8 is a fragmentary side view of the closure of Fig. 6.

The radiator 10 is of any suitable steam type and the fitting 11 is attached to it by the sleeve 12. The nipple 13 houses a check valve device 14 such as is employed in pneumatic tires. The suction device 15 has means at one end for quick attachment to the nipple 13 and at the other end means for attachment to a suction hose 16. The same fitting 11 may be used for the attachment of a conventional steam regulating valve 17 having a valve actuator 18 such as shown in the Simpson Patent 2,289,218 or the Jehle Patent 2,368,712.

The valve unit 20 has a spring-pressed needle valve 21 and is suitably supported in the tube 22 which has a flange 23. The valve unit is the same as the type commonly known in the trade as the "Schrader" type tire valve. The nut 24 is threaded on the outer end 25 of the nipple 13 for holding the nut 24 in place in the nipple.

The small end of the attachment 15 is screw threaded at 27 to receive the nut 28 for clamping the washer 29. This washer may be of soft rubber to frictionally grip the end of the screw threaded tube 25.

Inside the attachment 15 is located a pin 30 in line with the needle valve 21 so that when the attachment is slipped on the valve stem the valve 21 is automatically opened. The larger end 31 of the suction device 15 is provided with suitable means for attachment to a suction hose 16. As soon as the radiator is warm the hose is detached or the motor shut off.

Figs. 2 and 6 show means for automatically stopping the suction when the radiator gets warm. This can be effected by a thermostatically actuated valve 33 carried by a stem 34 on which is mounted an expansion chamber 35. A spring 36 normally keeps the valve open. When the air gets warm enough the chamber 35 expands and closes the valve 33 so as to avoid damage to the suction fan or motor. The regulator 17 will then come into action in the usual manner.

Fig. 6 shows a suitable form of thermostatic shut off consisting of a bimetal rod-like member 38 anchored at 39 in the suction device adapted to normally stand in line to open the check valve when the suction device is attached to the nipple. When this member is warped to a predetermined degree it will snap off out of line with the needle valve and allow the check valve to close automatically.

It will be understood that the check valve may be protected by a screw cap as is usual with tire valves.

The suction device may be connected with the suction hose 16 by screw threads as in Fig. 2 or by bayonet joints 40 as shown in Figs. 7 and 8.

I claim:

1. A device for applying suction between a steam radiator and the vent valve thereof, comprising, in combination, a T connection the opposite ends of which are to be connected to the radiator and to the vent valve, a tube extending from the middle opening of said T connection, a check valve located in said tube and normally closed, and a suction attachment, said attachment comprising at one end means for detachable connection to said tube and at the other end means for connecting said attachment to a source of suction, said attachment further comprising thermostatic means so constructed and arranged as to open said check valve upon connecting said suction attachment to said tube, and to disengage from said check valve in response to heat.

2. In a device according to claim 1, said thermostatic means comprising a bimetallic rod so located that when cold it moves said check valve to open position by positive contact as said attachment is being attached, and when hot moves to a position permitting said check valve to return to closed position.

3. A device for applying suction between a steam radiator and the vent valve thereof, comprising in combination, a T connection the opposite ends of which are to be connected to the radiator and to the vent valve, a tube extending from the middle opening of said T connection, a check valve located in said tube and normally closed, and a suction attachment, said attachment comprising at one end means for detachable connection to said tube and at the other end means for connecting said attachment to a source of suction, said attachment further comprising a thermostatically controlled valve between said check valve and said source of suction said last mentioned valve acting to close off suction in response to heat.

4. A device for applying suction between a steam radiator and the vent valve thereof, comprising, in combination, a T connection the opposite ends of which are to be connected to the radiator and to the vent valve, a tube extending from the middle opening of said T connection, a check valve located in said tube and normally closed, and a suction attachment, said attachment comprising at one end means for detachable connection to said tube and at the other end means for connecting said attachment to a source of suction, said attachment further comprising thermostatically responsive means for cutting off suction in response to heat.

ARTHUR PAUL KLOTH.

REFERENCES CITED

The following references are of record in the file of this patent:

UNITED STATES PATENTS

| Number | Name | Date |
|---|---|---|
| 1,177,508 | Giedsted | Mar. 28, 1916 |
| 1,302,938 | Lippert | May 6, 1919 |
| 1,352,265 | Hershey | Sept. 7, 1920 |
| 2,088,910 | Jencick et al. | Aug. 3, 1937 |
| 2,456,276 | Harstick | Dec. 14, 1948 |